United States Patent
Smolders et al.

(10) Patent No.: US 10,641,670 B2
(45) Date of Patent: May 5, 2020

(54) MAGNET UNIT FOR A SENSOR DEVICE OF A MOTOR VEHICLE, SENSOR DEVICE HAVING A MAGNET UNIT AND MOTOR VEHICLE HAVING A SENSOR DEVICE

(71) Applicant: VALEO Schalter und Sensoren GmbH, Bietigheim-Bissingen (DE)

(72) Inventors: Griet Smolders, Bietigheim-Bissingen (DE); Frank Jerems, Bietigheim-Bissingen (DE); Dirk Rachui, Bietigheim-Bissingen (DE); Ekkehart Fröehlich, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 16/309,261

(22) PCT Filed: Jun. 9, 2017

(86) PCT No.: PCT/EP2017/064097
§ 371 (c)(1),
(2) Date: Dec. 12, 2018

(87) PCT Pub. No.: WO2017/216051
PCT Pub. Date: Dec. 21, 2017

(65) Prior Publication Data
US 2019/0195714 A1    Jun. 27, 2019

(30) Foreign Application Priority Data
Jun. 13, 2016    (DE) .................. 10 2016 110 774

(51) Int. Cl.
*G01L 5/22*    (2006.01)
*H01F 7/02*    (2006.01)
(Continued)

(52) U.S. Cl.
CPC ............... *G01L 5/221* (2013.01); *G01D 5/14* (2013.01); *G01D 5/142* (2013.01);
(Continued)

(58) Field of Classification Search
CPC ... G01L 3/00; G01L 3/10; G01L 3/104; G01L 5/221; G01D 5/142; G01D 5/24442; H01F 7/021; H01F 7/0221
(Continued)

(56) References Cited

U.S. PATENT DOCUMENTS 6,259,343 B1 * 7/2001 Schwarz ............... H01F 7/0215
                                                     335/302
6,967,047 B2 * 11/2005 Heinrich ............... H01F 7/0252
                                                     277/317
(Continued)

FOREIGN PATENT DOCUMENTS

DE    19836451 A1    2/2000
DE    19836541 A1    2/2000
(Continued)

OTHER PUBLICATIONS

International Search Report and Written Opinion Issued in Corresponding PCT Application No. PCT/EP2017/064097, dated Sep. 4, 2017 (16 Pages with English Translation of Insternational Search Report).
(Continued)

*Primary Examiner* — Octavia Hollington
(74) *Attorney, Agent, or Firm* — Osha Liang LLP

(57) ABSTRACT

A magnet unit for a sensor device for acquiring a measured variable that characterizes a rotational state of a steering shaft of a motor vehicle, to a sensor device and to a motor vehicle, the magnet unit comprises: a sleeve and a magnet element that is connected in a positive-locking manner to the sleeve.

5 Claims, 3 Drawing Sheets

Figure 1:
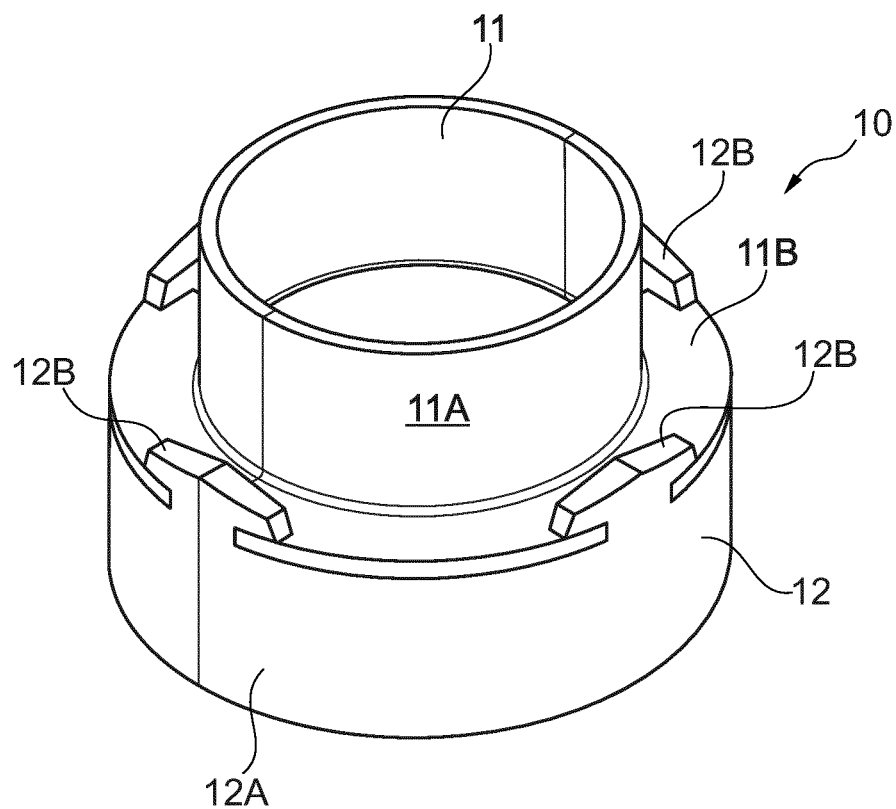

(51) Int. Cl.
  *G01D 5/244* (2006.01)
  *G01L 3/10* (2006.01)
  *G01D 5/14* (2006.01)

(52) U.S. Cl.
  CPC .......... *G01D 5/24442* (2013.01); *G01L 3/104* (2013.01); *H01F 7/021* (2013.01); *H01F 7/0221* (2013.01)

(58) Field of Classification Search
  USPC ...................... 73/862.325, 862.335, 862.191
  See application file for complete search history.

(56) References Cited

U.S. PATENT DOCUMENTS

| | | | | |
|---|---|---|---|---|
| 8,776,618 | B2* | 7/2014 | Lee | G01L 25/003 73/862.191 |
| 9,448,129 | B2* | 9/2016 | Yoshida | B62D 6/10 |
| 9,518,880 | B2* | 12/2016 | Schoepe | G01L 3/104 |
| 2016/0223361 | A1* | 8/2016 | Rachui | G01D 5/24442 |
| 2019/0027289 | A1* | 1/2019 | Goltz | G01D 5/244 |

FOREIGN PATENT DOCUMENTS

| | | | |
|---|---|---|---|
| DE | 10240049 A1 | 4/2003 | |
| DE | 10256322 A1 | 6/2004 | |
| DE | 102006023883 A1 | 11/2007 | |
| DE | 102007050258 A1 | 4/2009 | |
| DE | 102008014985 A1 | 9/2009 | |
| DE | 102008047466 A1 | 4/2010 | |
| DE | 102009039082 A1 * | 3/2011 | ............ G01D 5/145 |
| DE | 102009039082 A1 | 3/2011 | |
| DE | 102011085290 A1 | 5/2012 | |
| DE | 102011085290 A1 * | 5/2012 | ............ G01L 3/104 |
| DE | 102013006567 A1 | 10/2014 | |
| DE | 102013015452 A1 | 3/2015 | |
| EP | 1123794 A2 | 8/2001 | |
| EP | 01269133 B1 | 5/2004 | |
| JP | 2019-507495 A | 3/2019 | |
| WO | 2011023285 A1 | 3/2011 | |
| WO | 2017120687 A1 | 7/2017 | |

OTHER PUBLICATIONS

German Search Report Issued in Corresponding German Application No. 102016110774.3, dated May 17, 2017 (6 Pages).

Written Opinion in corresponding Korean Application No. 20187036148, dated Feb. 11, 2020 (11 pages).

The Notice of Reason for Rejection issued in corresponding Japanese Patent Application No. 2019-517162, dated Feb. 7, 2020 (9 pages).

* cited by examiner

MAGNET UNIT FOR A SENSOR DEVICE OF A MOTOR VEHICLE, SENSOR DEVICE HAVING A MAGNET UNIT AND MOTOR VEHICLE HAVING A SENSOR DEVICE

The invention relates to a magnet unit for a sensor device for acquiring a measured variable that characterizes a rotational state of a steering shaft of a motor vehicle, wherein the magnet unit comprises a sleeve for connecting the magnet unit to a first part of the steering shaft and said magnet unit also comprises a magnet element that is connected to the sleeve and comprises a magnetically-effective magnet section. The invention relates moreover to a sensor device for acquiring a measured variable that characterizes a rotational state of a steering shaft of a motor vehicle and said invention also relates to a motor vehicle having such a sensor device.

Generic magnet units are used by way of example in torque sensor devices for measuring a torque that is applied to a steering shaft of a motor vehicle. The manner in which such magnet units function is fundamentally known from the prior art, by way of example from EP 0 1 269 133 B1.

The magnet unit is usually configured so as to be attached to one of two parts of the steering shaft, said parts lying opposite one another in an axial direction, wherein in order to ascertain the rotational status of the steering shaft it is possible to attach a sensor device to the other shaft part, said sensor device having a magnetic stator that is provided so as to be arranged in the radial direction opposite the magnet element of the magnet unit with a small air gap between them. It is possible with the aid of the stator to transmit the magnetic flux, which occurs in the magnet element and is dependent upon the rotational status of the shaft, from the magnet element via a flux conductor onwards to a magnet sensor, by way of example to a Hall sensor, so as to generate a sensor signal.

Generic magnet units usually comprise an annular magnet element that is configured as a permanent magnet, and also generally a metal sleeve by means of which the magnet unit may be connected to the steering shaft, wherein it is known to connect the sleeve to the steering shaft in a non-rotatable manner by way of example by means of adhering, welding, caulking or by means of a press-fit connection.

The challenge always resides on the one hand in producing a permanent non-rotatable connection between the magnet unit and the steering shaft and on the other hand in producing a connection between the magnet element and the sleeve that is as far as possible free of play and non-rotatable.

The magnet element of generic magnet units is usually configured from a synthetic material that is filled with magnetic particles and is generally produced using a synthetic material injection moulding method. On the one hand, it is known to injection mould the magnet element directly to the sleeve or to injection mould the magnetic material around the sleeve. On the other hand, it is known to produce the sleeve and the magnet element initially separately and subsequently to connect the two to one another by way of example by means of adhering the two parts or by means of jointly injection moulding the two parts with a further synthetic material.

On account of the fill level of the magnetic particles being generally high, the synthetic material is generally relatively brittle or less elastic in particular in the case of low temperatures. On account of the sleeve and magnet element having different coefficients of thermal expansion, it is possible as the synthetic material melt cools for thermally-induced shrinkage stresses to occur, in particular if the magnet element is injection moulded directly onto the sleeve or if the magnetic material is injected moulded around the sleeve and said shrinkage stresses may lead to cracks forming in the magnet element.

Furthermore, it is also possible, in particular if the magnet element is injection moulded to the sleeve or is adhered to the sleeve, in the case of temperature fluctuations that occur during the operation for thermally-induced stresses to occur in the magnet unit, which likewise may lead to a crack forming in the magnet element.

For this reason, it is proposed in DE 10 2009 039 082 A1 initially to produce the sleeve and the magnet element separately and subsequently to connect the two parts in a positive-locking manner to one another rather than to adhere the two parts to one another, wherein the sleeve comprises for this purpose a bush-shaped basic body having a flange that extends radially outwards and comprises a plurality of cut-outs that are distributed in the peripheral direction. The magnet element is configured in a concentric manner with respect to the sleeve and is arranged outside said sleeve and comprises at its end face multiple domes that are configured in a corresponding manner with respect to the cut-outs and extend through the cut-outs in the flange of the sleeve and are connected to the flange in a positive-locking manner to the flange.

It is an object of the invention to provide an alternative magnet unit, preferably a magnet unit that is particularly simple to produce, in particular a magnet unit with which it is possible to reduce the risk of cracks forming in the magnet element as a result of thermally-induced stresses, but with which it is simultaneously possible to ensure in at least one operating state a non-rotatable connection that is free of play in the tangential direction.

This object is achieved in accordance with the invention by means of a magnet unit, by means of a sensor device and by means of a motor vehicle having the features in accordance with the respective independent claims. Advantageous embodiments of the invention are the subject matter of the dependent claims, the description and the figures and are further explained below.

A magnet unit in accordance with the invention for a sensor device for acquiring a measured variable that characterizes a rotational state of a steering shaft of a motor vehicle comprises a sleeve and also a magnet element, which is connected to the sleeve in a positive-locking manner, wherein the sleeve comprises a bush-shaped attaching section for connecting the magnet unit to a first part of the steering shaft and also a connecting flange that extends outwards in the radial direction and comprises at least one cut-out having a radial outer face for connecting to the magnet element. The magnet element of a magnet unit in accordance with the invention comprises a magnetically-effective magnet section and also at least one connecting element that extends in the axial direction and comprises a radial inner face for connecting to the sleeve.

In so doing, when the magnet unit is being used in the state of use in accordance with its intended function, at least one connecting element of the magnet element extends through at least one cut-out in the connecting flange of the sleeve and is configured in such a manner that the connecting element of the magnet element forms a positive-locking connection in the tangential direction and in the axial direction with the connecting flange of the sleeve. In accordance with the invention, the magnet unit is configured in such a manner that in at least one operating state, preferably in a reference state in the case of a reference ambient temperature, the radial inner face at least of one connecting element is spaced in the radial direction with respect to the radial outer face of the associated cut-out of the connecting flange of the sleeve.

The term 'state of use of the magnet unit in accordance with its intended function' is understood in terms of the invention to mean a state in which the magnet element is connected in a positive-locking manner in the tangential direction and in the axial direction to the sleeve.

It is preferred that at least one of the cut-outs in the connecting flange is configured in a manner open outwards in the radial direction, wherein it is particularly preferred that all cut-outs are configured as open cut-outs. However, in some cases, it may also be advantageous if at least one cut-out is configured as an elongated hole, in particular as an elongated hole that is oriented in the radial direction, wherein in this case, in particular in at least one operating state, it is preferred that also one radial outer face of the associated connecting element is located spaced in the radial direction with respect to a radial inner face of the elongated hole, in other words in at least one operating state, in particular in the reference state, said radial outer face is arranged spaced both with respect to the inner hole edge and also with respect to the outer hole edge.

By virtue of the radial inner face at least of one connecting element, preferably all connecting elements, being arranged in accordance with the invention respectively spaced in the radial direction with respect to the radial outer face of the associated cut-out in the connecting flange of the sleeve, it is possible for the magnet element to contract or shrink in the radial direction in the case of changes in temperature without being hindered thereby by the sleeve. In other words, by virtue of the fact that in accordance with the invention the connecting elements do not lie in the radial direction in the cut-out, in particular do not face inwards, it is possible for the magnet element to contract or shrink in an almost unhindered manner. If the cut-outs in the connecting flange of the sleeve are configured open outwards in the radial direction and/or in the shape of an elongated hole with sufficient spacing with respect to the outer hole edge or with respect to the radial inner face of the elongated hole with respect to the connecting element, it is possible for the magnet element to also expand unhindered in the case of changes in temperature.

It is thus possible using a magnet unit in accordance with the invention to reduce in a particularly simple manner the occurrences of thermally-induced stresses in the magnet element which could otherwise lead to the formation of cracks in the magnet element. In the case of a corresponding configuration of sleeve and magnet element, in particular in the case of a correspondingly large spacing in the radial direction between the connecting element and the cut-out, it is even possible to largely prevent thermally-induced stresses occurring.

In one advantageous embodiment of a magnet unit in accordance with the invention, the sleeve comprises at least three, in particular at least four, cut-outs that are arranged distributed in the peripheral direction, and the magnet element comprises preferably at least three, in particular likewise at least four, connecting elements that are arranged distributed in a manner corresponding to the cut-outs. It is particularly preferred that the cut-outs and/or connecting elements are arranged uniformly distributed in the peripheral direction. By virtue of the plurality of the positive-locking connections that are arranged distributed around the periphery and are formed in each case by means of the cut-outs and the connecting elements, it is possible to prevent a lateral or tangential displacement between the magnet element and the sleeve. By virtue of arranging the positive-locking connections in a uniformly distributed manner in the peripheral direction, it is possible to distribute force uniformly to the individual positive-locking connections.

In a further advantageous embodiment of a magnet unit in accordance with the invention, the sleeve and the magnet element have different coefficients of thermal expansion, wherein preferably the length and/or volume of the coefficient of thermal expansion of the magnet element are/is greater than the length and/or volume of the coefficient of thermal expansion of the sleeve. In so doing, the sleeve and the magnet element are preferably configured in such a manner that at least one positive-locking connection between the magnet element and the sleeve in a reference state in the case of a reference ambient temperature is free of play in the tangential and/or axial direction.

The reference ambient temperature at which the positive-locking connection between the magnet element and the sleeve is preferably free of play in the tangential and/or axial direction is preferably in a temperature range of 15° C. to 30° C., in particular between 20° C. and 25° C. and is preferably 20° C. or 23° C.

In a further advantageous embodiment of a magnet unit in accordance with the invention, when the magnet unit is being used in the state of use in accordance with its intended function, at least one connecting element of the magnet element comprises at least one undercut so as to form the axial positive-locking connection with the connecting flange of the sleeve, wherein the connecting element is preferably configured in a hook-shaped and/or T-shaped and/or anchor-shaped manner.

The sleeve of a magnet unit in accordance with the invention preferably comprises metal and/or is produced from metal, wherein the sleeve is preferably produced by means of a deep drawing method. It is preferred that the sleeve is configured in such a manner that it may be attached to a part of the steering shaft by means of a press-fit method or may be welded to the part of the steering shaft. Alternatively, the sleeve may also be caulked or adhered to the part of the steering shaft, wherein however a connection to the steering shaft by means of a press-fit connection or a weld connection has proven to be particularly advantageous.

The magnet section of the magnet element is preferably configured likewise in a tubular or annular manner, in particular closed in the peripheral direction, or is configured in such a manner that it functions in a similar manner to that of a tubular or annular magnet section or to that of a conventional annular magnet known from the prior art, wherein the magnet section is preferably arranged in a concentric manner with respect to the sleeve.

The magnet element of a magnet unit in accordance with the invention preferably comprises a synthetic material that is filled with magnetic particles and/or is configured from such a synthetic material, wherein the magnet element is preferably produced using a synthetic material injection moulding method. It is particularly preferred that the magnet element has been produced by means of injection moulding to the sleeve and/or by being injection moulded around the sleeve, and has been connected in this manner to the sleeve.

As an alternative to attaching the magnet element by means of injection moulding it to the sleeve and/or injection moulding it around the sleeve, it is possible also to initially produce the magnet element separately from the sleeve and subsequently to connect it in a positive-locking manner to the sleeve, wherein the magnet element is also produced in this case preferably using a synthetic material injection moulding method. In so doing, the magnet element is however preferably produced initially with connecting elements that are configured in a dome-shaped manner but without an undercut, with the result that it is possible by means of axially displacing the magnet element relative to the sleeve to insert the connecting elements into the associated cut-outs in the connecting flange of the sleeve or to guide said connecting elements through the cut-outs.

It is preferred that the connecting elements are configured in such a manner that in particular after inserting or guiding said connecting elements through the cut-outs in the connecting flange of the sleeve said connecting elements may deform in such a manner that the undercuts that are required to produce the axial positive-locking connection are produced. In so doing, the connecting elements are preferably configured so as to deform accordingly by means of caulking, hot caulking or ultrasound caulking, in particular in such a manner that the positive-locking connections that are produced in so doing between the magnet element and the sleeve are free of play in the tangential direction and/or in the axial direction in the reference state.

The deformation of synthetic connecting elements by means of caulking, in particular hot caulking or ultrasound caulking, is generally known from the prior art, with the result that further statements in this respect are not provided at this point.

A sensor device in accordance with the invention for acquiring a measured variable that characterizes a rotational status of a steering shaft of a motor vehicle comprises a magnet unit in accordance with the invention.

A motor vehicle in accordance with the invention having a sensor device comprises a sensor device in accordance with the invention having a magnet unit in accordance with the invention.

The advantageous embodiments that are presented with regard to the magnet unit and their advantages also apply accordingly for a sensor device in accordance with the invention and for a motor vehicle in accordance with the invention.

Further features of the invention are disclosed in the claims, the figures and the description of the figures. All the features and feature combinations mentioned above in the description and also the features and feature combinations that are mentioned below in the description of the figures and/or that are only illustrated in the figures may be used not only in the respectively disclosed combination but also in other combinations or however as standalone.

The invention is now further explained with the aid of an advantageous exemplary embodiment and reference to the attached drawings.

Figure 2:
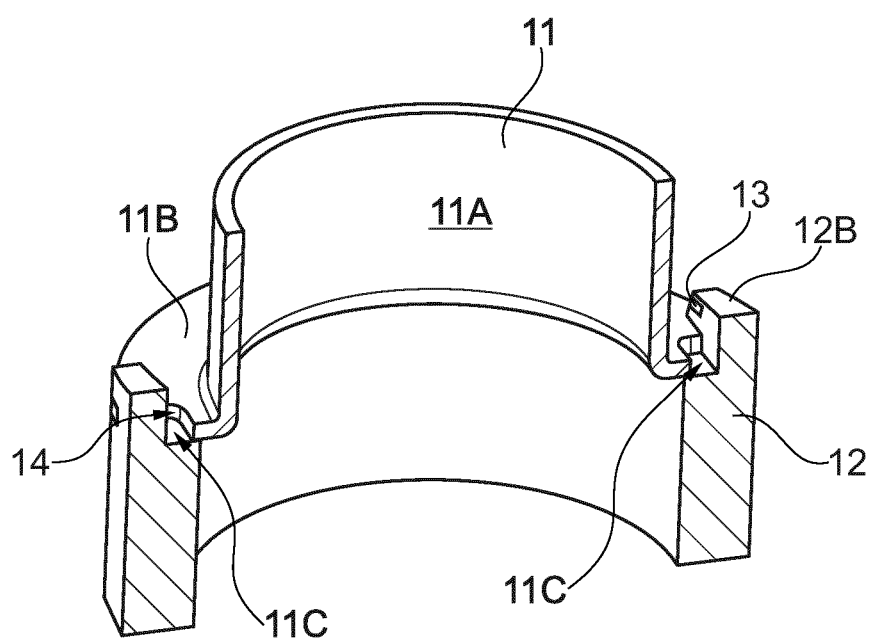
Figure 3:
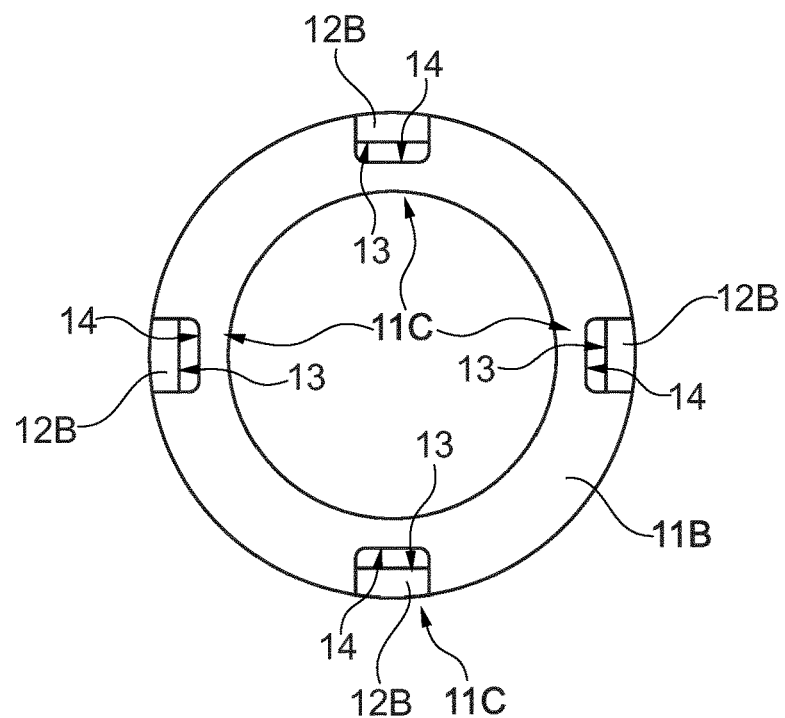
Figure 4:
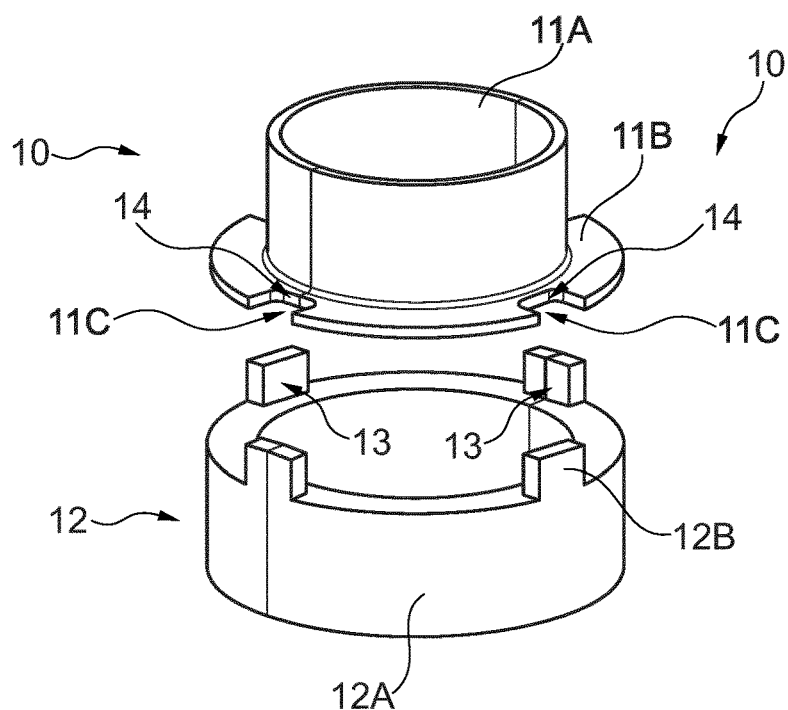
Figure 5:
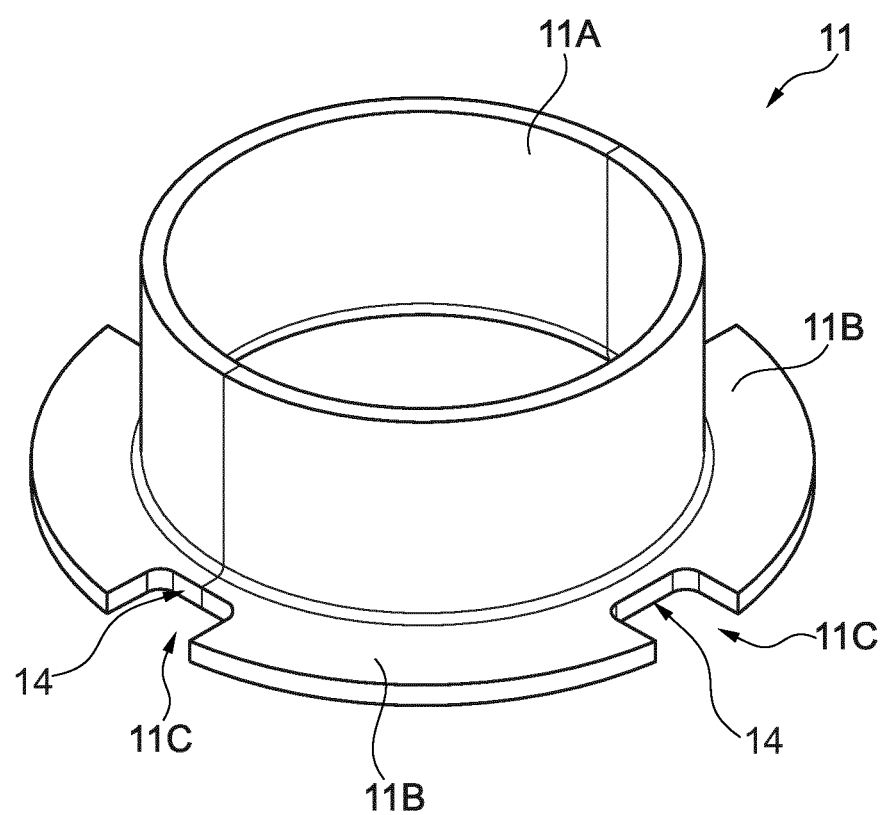

In the drawings:

FIG. 1 illustrates a perspective view of a first exemplary embodiment of a magnet unit in accordance with the invention, FIG. 2 illustrates a longitudinal sectional view through the magnet unit in accordance with the invention shown in FIG. 1, FIG. 3 illustrates a cross-sectional view, in the region of the positive-locking connection between the sleeve and magnet element, of a magnet unit in accordance with the invention shown in FIGS. 1 and 2, FIG. 4 illustrates the magnet unit in accordance with the invention shown in FIGS. 1 to 3 prior to the positive-locking connection being produced between the sleeve and the magnet element and FIG. 5 illustrates a perspective individual view of the sleeve of the magnet unit in accordance with the invention shown in FIGS. 1 to 4.

FIG. 1 illustrates a first exemplary embodiment of a magnet unit 10 in accordance with the invention having a sleeve 11 and a magnet element 12, wherein the sleeve 11 comprises a bush-shaped attaching section 11A for attaching the magnet unit to a first part of a steering shaft [not illustrated] and said sleeve also comprises a connecting flange 11B that extends outwards in the radial direction so as to connect the sleeve 11 to the magnet element 12.

The magnet element 12 of the magnet unit 10 in accordance with the invention comprises an effective magnet section 12A that is likewise configured in a bush-shaped or tube-shaped manner, and in this case said magnet unit comprises four connecting elements 12B that are arranged uniformly distributed in the peripheral direction. The sleeve 11 comprises in its connecting flange 11B accordingly four cut-outs 11C that are likewise arranged uniformly distributed in the peripheral direction, of. also FIGS. 2 to 5, and the connecting elements 12B of the magnet element 12 are each guided in the axial direction through said cut-outs.

The connecting elements 12B are configured in such a manner that they form with the connecting flange 11B of the sleeve 11 a positive-locking connection both in the tangential direction as well as in the axial direction, wherein the connecting elements 12B are each configured for this purpose in a T-shaped or anchor-shaped manner and comprise corresponding undercuts.

In accordance with the invention, the connecting elements 12B are configured in such a manner that they are arranged with their radial inner faces 13 spaced in the radial direction with respect to the radial outer faces 14 of the associated cut-outs 11C, with the result that the magnet element may contract unhindered inwards in the radial direction in the case of temperature fluctuations, in other words said magnet element may shrink unhindered. By virtue of the fact that the cut-outs 11C are configured in an outwardly open manner in the radial direction, the magnet element 12 may also expand unhindered outwardly in the radial direction. FIG. 3 illustrates in a particularly clear manner the spaced arrangement of the connecting elements 12B, in particular the spacing between the radial inner faces 13 of the connecting elements 12B and the radial outer faces of the cut-outs 11C.

In the case of this exemplary embodiment of a magnet unit 10 in accordance with the invention, the positive-locking connections between the connecting elements 12B and the connecting flange 11B of the sleeve 11 are moreover configured in such a manner that in a reference state in the case of a reference ambient temperature of 20'C said connections are free of play both in the tangential direction and also in the axial direction.

In order to produce the described, inventive magnet unit 10, the sleeve 11 and the magnet element 12 are each initially produced separately, cf. FIG. 4, wherein the connecting elements 12B of the magnet element 12 are initially produced as the entire magnet element using a synthetic material injection moulding method initially as dome-shaped or web-shaped connecting elements without undercuts. Subsequently, the sleeve 11 and the magnet element 12 are joined together in the axial direction, wherein in so doing, the connecting elements 12B are inserted into the cut-outs 11C of the sleeve 11 or rather said connecting elements are guided through the cut-outs. In a further step, the connecting elements 12B are deformed by means of a deforming method, in particular by means of hot caulking, in such a manner that the T-shaped or anchor-shaped construction of the connecting elements 12B that is clearly apparent in FIGS. 1 and 2 is produced with the undercuts that each form the axial positive-locking arrangement.

Alternatively, in order to produce a magnet unit 10 in accordance with the invention, it is naturally possible to injection mould the magnet element to the sleeve, wherein for this purpose the corresponding injection moulding tool should be configured in such a manner that each of the radial inner faces of the connecting elements do not extend as far as the radial outer faces of the associated cut-outs but rather in accordance with the invention they are injection moulded at a spacing in the radial direction with respect thereto, so that the magnet element is able to shrink unhindered in the radial direction, with the result that it is possible to avoid thermally-induced stresses occurring in the magnet element or rather the risk of such thermally induced stresses occurring in the magnet element may be considerably reduced.

It goes without saying, that numerous construction modifications to the explained exemplary embodiment are possible without departing from the content of the claims.

LIST OF REFERENCE NUMERALS

10 Magnet unit in accordance with the invention
11 Sleeve
11A Bush-shaped attaching section
11B Connecting flange
11C Cut-out
12 Magnet element
12A Effective magnet section
12B Connecting element
13 Radial inner face of the connecting element
14 Radial outer face of the cut-out

The invention claimed is:

1. A magnet unit for a sensor device for acquiring a measured variable that characterizes a rotational state of a steering shaft of a motor vehicle, the magnet unit comprising:
   a sleeve; and
   a magnet element that is connected in a positive-locking manner to the sleeve,
   wherein the sleeve comprises a bush-shaped attaching section for connecting the magnet unit to a first part of the steering shaft and a connecting flange that extends outwards in the radial direction and comprises at least one cut-out having a radial outer face for connecting to the magnet element,
   wherein the magnet element comprises a magnetically-effective magnet section and at least one connecting element that extends in the axial direction and comprises a radial inner face for connecting to the sleeve,
   wherein when the magnet unit is being used in the state of use in accordance with a function of the magnet unit, at least one connecting element of the magnet element extends through at least one cut-out in the connecting flange of the sleeve and is configured in such a manner that the connecting element-of the magnet element forms a positive-locking connection in the tangential direction and in the axial direction with the connecting flange of the sleeve,
   wherein the magnet unit is configured so that in at least one operating state, in a reference state in the case of a reference ambient temperature, the radial inner face at least of one connecting element is spaced in the radial direction with respect to the radial outer face of the associated cut-out of the connecting flange of the sleeve,
   wherein, when the magnet unit is being used in the state of use in accordance with the intended function, at least one connecting element of the magnet element comprises at least one undercut so as to form the axial positive-locking connection with the connecting flange of the sleeve, wherein the connecting element is configured in one selection from the group consisting of: a hook-shaped, T-shaped and anchor-shaped manner.

2. The magnet unit according to claim 1, wherein the sleeve comprises at least four cut-outs that are arranged distributed in the peripheral direction, wherein the magnet element comprises at least four connecting elements that are arranged distributed in a corresponding manner to cut-outs.

3. The magnet unit according to claim 1, wherein the sleeve and the magnet element have different coefficients of thermal expansion, wherein the length and/or volume of the coefficient of thermal expansion of the magnet element are/is greater than the length and/or volume of the coefficient of thermal expansion of the sleeve, and wherein the sleeve and the magnet element are configured in such a manner that at least one positive-locking connection between the sleeve and the magnet element in the reference state in the case of the reference ambient temperature is free of play in the tangential and/or axial direction.

4. A sensor device for acquiring a measured variable that characterizes a rotational state of a steering shaft of a motor vehicle, wherein the sensor device comprises a magnet unit according to claim 1.

5. The motor vehicle having a sensor device, wherein the sensor device is configured according to claim 4.

* * * * *